UNITED STATES PATENT OFFICE.

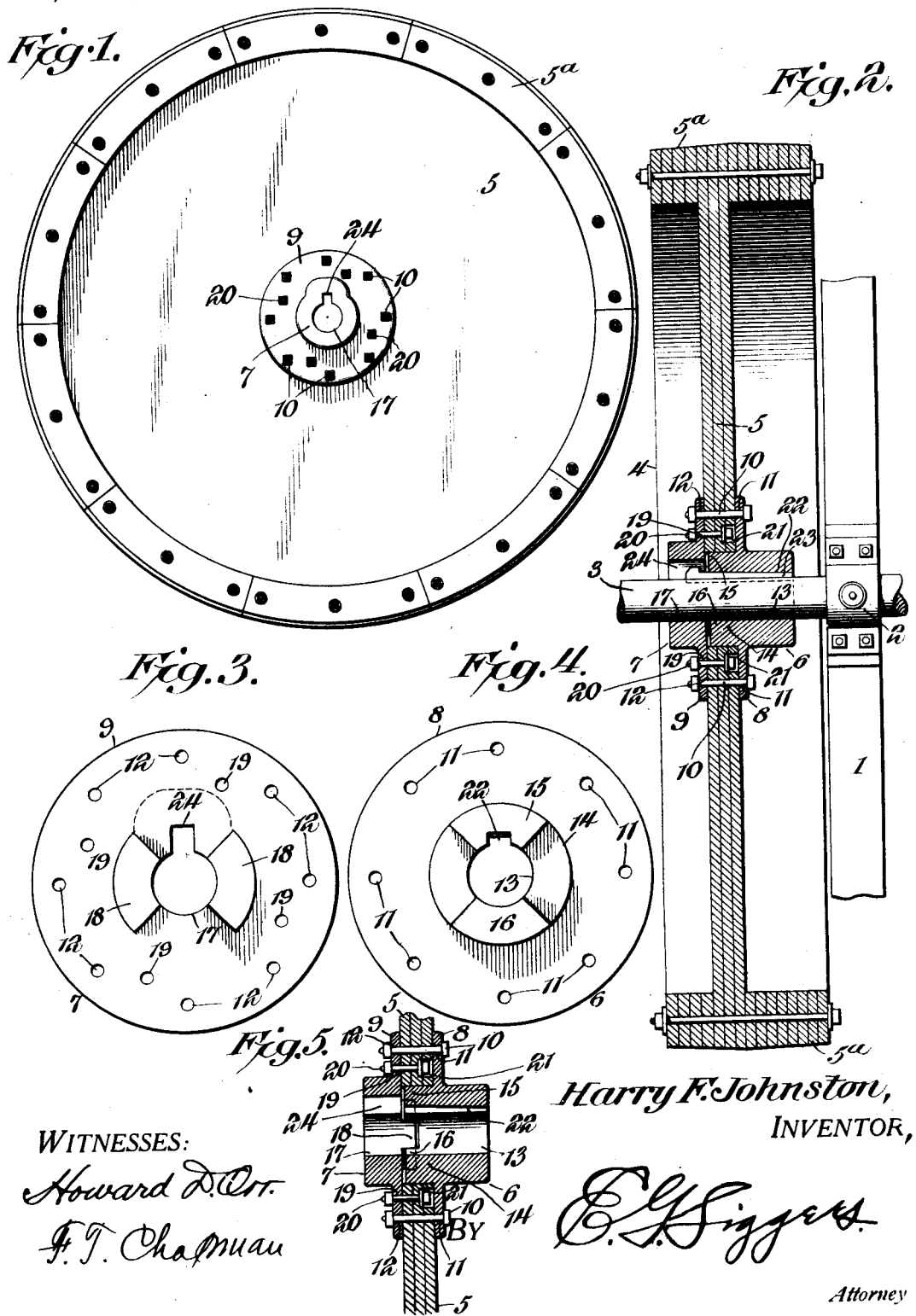

HARRY F. JOHNSTON, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA.

DEMOUNTABLE BAND-WHEEL.

1,171,848.  Specification of Letters Patent.  Patented Feb. 15, 1916.

Application filed August 24, 1915.  Serial No. 47,119.

*To all whom it may concern:*

Be it known that I, HARRY F. JOHNSTON, a citizen of the United States, residing at Beaver Falls, in the county of Beaver and State of Pennsylvania, have invented a new and useful Demountable Band-Wheel, of which the following is a specification.

This invention has reference to demountable band wheels and its object is to provide a band wheel especially for use in connection with deep well drilling machinery, wherein the band wheel may be removed from and replaced upon the shaft carrying it without disturbance of the proper centering of the parts, especially on replacing the wheel.

To this end the invention comprises a band wheel with a two-part hub, one part of which remains permanently attached to the drive shaft and the other part of which is permanently attached to the wheel, so that the wheel may be separated from the part of the hub fast to the shaft with the assurance that when the wheel is again placed upon the shaft it is in the same proper relation thereto as when first installed.

The invention will be best understood from a consideration of the following detailed description, taken in connection with the accompanying drawings forming part of this specification with the further understanding that while the drawings show a practical form of the invention, the latter is not confined to any strict conformity with the showing of the drawings, but may be changed and modified so long as such changes and modifications come within the scope of the appended claims.

In the accompanying drawings:—Figure 1 is a face view of a band wheel constructed in accordance with the present invention. Fig. 2 is a diametric section of the wheel mounted on the shaft but with the wheel turned into 90° relation to the showing of Fig. 1. Fig. 3 is an inner face view of the removable hub section. Fig. 4 is an inner face view of the hub section designed to remain permanently fixed to the shaft. Fig. 5 is a detail section of the hub portion of the wheel in a plane similar to that of Fig. 2, but with the shaft omitted.

The band wheel of the present invention is of relatively massive construction and in actual practice is or may be made in the neighborhood of eight feet in diameter with a seventeen or eighteen inch face and with the hub flanges nearly two feet in diameter. Such a band wheel is employed on very heavy portable oil well rigs and forms an essential part thereof. The band wheel as indicated by the dimensions named is very large and heavy, and, in fact, in practice it is difficult to move the machine without first removing the wheel. In such oil well rigs the wheel hangs so low that it is quite impossible to move the machine over the rough rocky or stumpy ground found in the oil country without injury to the wheel. Without special provision for the purpose it is very difficult to remove so large and heavy a wheel and again replace it upon its shaft and this is especially true in the rough country in which the machines provided with such wheels are used.

In the drawings there is shown in Fig. 1 a sill 1 which, however, does not form part of the present invention, but which may be taken as indicative of the machine upon which the wheel is mounted. The sill 1 supports one of the journal bearings 2 of a shaft 3 by which the band wheel of the present invention is carried.

The band wheel, indicated generally at 4, comprises a web 5 and rim 5ª usually made of wood, and, as before stated, of large dimensions, the figures hereinbefore given being those of a band wheel employed upon certain oil well rigs.

The wheel 4 is provided with a hub consisting of two members 6, 7, respectively. The member 6 has a circumferential radial flange 8 and the member 7 has a similar flange 9, these flanges being designed to engage opposite sides of the web 5 which is joined to the two members of the hub by bolts 10 traversing both flanges through circular series of holes 11, 12 in the respective flanges 8 and 9.

The hub member or section 6 on that side of the flange 8 toward the hub member or section 7 is provided about the bore 13 of the hub with an annular boss 14 having diametrically opposite lugs 15, 16, respectively, extended parallel with the axis of the hub and in the particular showing of the drawings these lugs are spaced apart circumferentially by distances substantially equal to the circumferential length of the lugs. The lugs, therefore, each represent a segment of 90° and are separated by spaces of 90°.

The hub section 7 on the side of the flange 9 toward the other hub section 6 has about its bore or eye 17 and on diametrically opposite sides thereof, segmental lugs 18 projecting parallel with the axis of the hub section and adapted to the spaces between the lugs 15 and 16. The lugs 18 are segmental in shape and each include an arc of about 90° and are spaced apart a distance of about 90° so as to enter between the adjacent edges of the lugs 15 and 16 in close but free fit therewith. It is not necessary that the 90° size should be maintained with any exactitude, but the circumferential extent of all the lugs approximate 90°, thus distributing the metal in the lugs about equally, due allowance being made for such slight variations as are needed to produce a free though relatively snug fit when the lugs intermesh as they do when the flanges 8 and 9 are brought into engagement with opposite sides of the web 5. The flange 9 is provided with a series of perforations 19 which may be arranged interior to the series of perforations 12, and these perforations 19 are traversed by bolts 20 extending into the web 5 and having the heads remote from the flange 9 lodged in countersinks 21 in the web 5. By this means the hub section 7 is made fast to the web 5 so as to always maintain the initial relation thereto. The hub section 6 is formed with a key-way 22 for the reception of a key 23, whereby the hub section 6 is permanently secured to the shaft 3 in the initial installation of the parts and is intended to so remain.

The lugs 15, 16, project from the inner face of the flange 8 by a distance a little short of the thickness of the web 5 and the lugs 18 project from the inner face of the flange 9 by a distance about the depth of the spaces between the lugs 15 and 16, so that when the parts are assembled the lugs 18 do not bottom in the spaces between the lugs 15 and 16, but have a slight clearance. For instance, if it be assumed that the web 5 is about three inches in thickness, the flanges 8 and 9 when in clamping relation to the web are spaced apart by about three inches. The outer ends of the lugs 15 and 16 stand from the inner face of the flange 8 by about two and three-fourths inches with the lugs themselves about one and one-quarter inches from the boss 14. The lugs 18 are likewise about one and one-quarter inches in extent from the inner face of the flange 9. There is, therefore, a slight clearance of a quarter of an inch or less permitting a tight clamping of the wheel webbing between the flanges 8 and 9. The lugs intermesh snugly and when the hub sections are brought into such intermeshing relation the hub section 6 of course drives the hub section 7, and the latter being connected to the web 5 by two circular rows of bolts, one of which is carried through the flange 8, the wheel web 5 is firmly united to the shaft without any danger of the hub sections working upon each other.

In order that the hub section 7 may be applied to and removed from engaging relation to the hub section 6 without interference by the key 23, it is provided with a radial recess 24 entering the bore 17 and extending therefrom and of a radial extent sufficient to clear the head of the key 23. When the wheel is initially mounted on the shaft 3 the hub section 6 is made permanently fast to the shaft by the key 23. The hub section 7 is made permanently fast to the web 5 of the band wheel 4 by the bolts 20. Then the band wheel is applied to the shaft with the lugs 18 entering between the lugs 15 and 16 in intermeshing relation thereto and the band wheel with the hub section 7 is secured to the hub section 6 by the bolts 10 traversing the two flanges 8 and 9 and the intervening portion of the web 5.

If it is desired to remove the band wheel from the shaft 3 it is only necessary to remove the bolts 10, wherupon the band wheel is moved lengthwise of the axis of rotation, thus withdrawing the lugs 18 from between the lugs 15 and 16, the recess 24 affording plenty of clearance for the head of the key 23. When it is desired to replace the band wheel the latter is moved along the shaft 3 with the hub section 7 encircling the shaft until the lugs 18 are again introduced between the lugs 15 and 16 in intermeshing relation therewith, and since the fit of the lugs is snug the perforations 11 and 12 are in alinement and the bolts 10 are readily passed through these perforations and the intervening web 5 to again secure the band wheel to the shaft 3.

The hub section 6 is permanently fast on the shaft 3 and the hub section 7 is permanently fast to the band wheel in the sense that neither hub section is removed from the part carrying it on removing the band wheel from the shaft or applying it thereto. Since the hub section 7 remains at all times permanently bolted to the wheel 4 and the lugs 15, 16 and 18 snugly intermesh, the wheel as a whole is always true to its center when replaced, while the heavy jarring incident to the operation of the machine is effectively taken care of by the lugs so that it cannot throw the wheel out of true.

What is claimed is:—

1. A band wheel structure for heavy service, comprising a band wheel having a hub divided into two axially separable sections with one section adapted to be permanently fastened to the shaft carrying the band wheel and the other section permanently fastened to the band wheel with the sections provided with intermeshing axially extended lugs, and a removable fastening means for holding the hub sections together.

2. A band wheel structure comprising a band wheel having an interior web extending from the hub portion to the rim portion of the wheel, a hub section permanently fast to one face of the band wheel web and provided on the band wheel side with axially extended circumferentially spaced lugs, another hub section adapted to be permanently secured to the shaft upon which the wheel is mounted and provided with axially extended lugs positioned to intermesh with those of the other hub section, and fastening devices traversing both hub sections and the intervening web of the band wheel.

3. A band wheel provided with a divided hub consisting of two flanged sections with the flanges on opposite sides of the hub portion of the band wheel, with one section of the hub permanently fastened to the band wheel and the other section adapted to be permanently fastened to a shaft upon which the band wheel is mounted, and removable fastening devices traversing the flanges of the hub sections and the intervening portion of the band wheel, said hub sections having intermeshing projections from those faces of the flanged portions of the hub sections facing each other in the assembled wheel.

4. A band wheel for heavy work provided with a rim and interior web extending to the hub portion of the wheel, and a divided hub consisting of two sections each having a radial flange, with the flanges adapted to engage opposite sides of the web of the wheel, and the hub sections being provided with intermeshing axially extended lugs on the facing portions in the assembled wheel, one hub section being adapted to be permanently fastened to a shaft and the other hub section being permanently fastened to the wheel, and removable means for holding said hub sections in clamping relation to the web of the wheel.

5. A wheel provided with a two part hub with the two parts engaging the wheel from opposite sides, removable means for holding the two parts of the hub together, said two parts of the hub having an interior circular series of intermeshing lugs alternating with respect to the hub parts, one hub part being permanently fast to the wheel and the other hub part being adapted to be permanently secured to a shaft designed to carry the wheel.

6. A wheel provided with a two part hub with the two parts engaging the wheel from opposite sides, removable means for holding the two parts of the hub together, said two parts of the hub having an interior circular series of intermeshing lugs alternating with respect to the hub parts, one hub part being permanently fast to the wheel and the other hub part being adapted to be permanently secured to a shaft designed to carry the wheel, the fastening means for securing one part of the hub to the wheel and the fastening means for securing the hub parts together being exterior to the intermeshing lugs.

7. A band wheel provided with a rim and a web interior thereto extending to the hub portion of the wheel, a two-part hub with each part having a radial flange adapted to engage a corresponding face of the web portion of the wheel and said hub parts being formed interior to the flanges with a circular series of lugs alternating with respect to the two parts of the hub and adapted to intermesh, fastening devices permanently securing one hub part to the web of the wheel through the flange of said hub part, and other removable fastening devices securing the two flanges together and to the web of the wheel.

8. A band wheel provided with a rim portion and an interior web, a hub section with a key-way and a key for permanently fastening the hub section to a shaft designed to carry the band wheel, said hub portion having a radially extended flange adapted to engage one face of the web of the wheel and on the wheel side of the flange provided with circumferentially spaced axially extended lugs, another hub section provided with a radially extended flange extending to the opposite face of the web portion of the wheel and permanently secured thereto, said second-named hub portion having on the wheel side of its flange axially projecting circumferentially spaced lugs matching the spaces between the lugs on the other hub section, the hub flanges and the web of the wheel having matching perforations for removable fastening devices for holding the hub sections together and to the wheel and permitting the removal of the wheel with the hub section permanently fastened thereto from the other hub section and the shaft to which it is permanently connected.

9. A band wheel provided with a two part hub with the parts movable toward and from each other in the direction of the axis of rotation, both hub sections being provided with radial flanges adapted to opposite sides of the wheel, one hub section having an axially extended boss for receiving the wheel and axially projecting circumferentially spaced lugs extending from the boss, and the other hub section being provided with axially extending lugs circumferentially spaced to enter between lugs of the other hub section, said second-named hub sections being permanently secured to the wheel, and the first-named hub section being adapted to be permanently secured to a shaft designed to carry the wheel, and removable means for holding said wheel and hub sections together and on their removal permitting the removal of the wheel and the hub section permanently fast thereto from the hub section and the shaft to which it is adapted to be permanently secured.

10. A band wheel for heavy service provided with a divided hub having one section permanently secured to the wheel and the other section adapted to be permanently secured to a shaft by which the band wheel is to be carried and both sections having intermeshing portions, and means for removably securing the body of the wheel and first-named hub section to the second named hub section.

In testimony, that I claim the foregoing as my own, I have hereto affixed my signature in the presence of two witnesses.

HARRY F. JOHNSTON.

Witnesses:
C. H. THOMPSON,
H. W. DANN.